United States Patent
Kim

(10) Patent No.: US 6,206,802 B1
(45) Date of Patent: Mar. 27, 2001

(54) HYDRAULIC CONTROL SYSTEM FOR 4-SPEED AUTOMATIC TRANSMISSION

(75) Inventor: Tae-Kyun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/375,364

(22) Filed: Aug. 17, 1999

(30) Foreign Application Priority Data

Feb. 11, 1999 (KR) .................................................. 99-4782

(51) Int. Cl.$^7$ .................................................. F16H 61/26
(52) U.S. Cl. ..................... 477/127; 475/127; 475/130; 475/131; 477/131
(58) Field of Search ............................... 477/63, 64, 127, 477/120, 118; 475/123, 127, 131, 128, 133

(56) References Cited

U.S. PATENT DOCUMENTS

| | | | |
|---|---|---|---|
| 5,288,279 | * 2/1994 | Sakai et al. | 475/127 |
| 5,513,104 | * 4/1996 | Tsutsui et al. | 364/424.1 |
| 5,836,845 | * 11/1998 | Sakaguchi et al. | 475/131 |

* cited by examiner

*Primary Examiner*—Charles A Marmor
*Assistant Examiner*—Tisha D. Waddell

(74) *Attorney, Agent, or Firm*—Birch, Stewart, Kolasch & Birch, LLP

(57) ABSTRACT

A hydraulic control system for 4-speed automatic transmissions in which line pressure, drive pressure, reverse pressure and low pressure are selectively supplied from a manual valve to an underdrive clutch, an overdrive clutch, a low-reverse brake, a reverse clutch, and a second brake to realize four forward speeds and a reverse speed. The hydraulic control system includes an underdrive pressure control valve provided between a drive pressure line and the underdrive clutch, and controlled by a first solenoid valve; an overdrive pressure control valve provided between the drive pressure line and the overdrive clutch, and controlled by a second solenoid valve; a second/low-reverse pressure control valve connected to a line pressure line and controlled by a third solenoid valve; a solenoid switch valve controlled by low pressure, line pressure or drive pressure supplied respectively from a low pressure line, the line pressure line and the drive pressure line, and which supplies hydraulic pressure to the low-reverse brake and the second brake; and a fail-safe valve provided between the solenoid switch valve and the second/low-reverse pressure control valve, and is controlled by operational pressure of the underdrive clutch and overdrive clutch, line pressure, and drive or reverse pressure, the fail-safe valve preventing hydraulic pressure supplied from the second/low-reverse pressure control valve from being simultaneously supplied to the second brake and the low reverse brake. The reverse clutch is directly communicated with the manual valve via a reverse pressure line.

6 Claims, 4 Drawing Sheets

FIG.2

| Shift Range \ Solenoid Valve | S1 | S2 | S3 |
|---|---|---|---|
| P | ON | ON | ON |
| R | ON | ON | OFF |
| N | ON | ON | ON |
| 1 | OFF | ON | ON |
| 2 | OFF | ON | OFF |
| 3 | OFF | OFF | ON |
| 4 | ON | OFF | OFF |
| L | OFF | ON | OFF |

FIG.3

| Shift Range | Friction Element | | | | |
|---|---|---|---|---|---|
| | LR-B | 2ND-B | UD-C | OD-C | REV-C |
| 1(L) | (○) | | ○ | | |
| 2 | | ○ | ○ | | |
| 3 | | | ○ | ○ | |
| 4 | | ○ | | ○ | |
| R | ○ | | | | ○ |
| N,P | ○ | | | | |

FIG.5

| Shift Range | Solenoid Velve | | | |
|---|---|---|---|---|
| | LR-S | 2ND-S | UD-S | OD-S |
| 1 | OFF | ON | OFF | ON |
| 2 | ON | OFF | OFF | ON |
| 3 | ON | ON | OFF | OFF |
| 4 | ON | OFF | ON | OFF |
| R | OFF | ON | ON | ON |
| N,P | OFF | ON | ON | ON |

ABSTRACT# HYDRAULIC CONTROL SYSTEM FOR 4-SPEED AUTOMATIC TRANSMISSION

BACKGROUND OF THE INVENTION (a) Field of the Invention

The present invention relates to a hydraulic control system, and more particularly, to a hydraulic control system for a four-speed automatic transmission in which a number of pressure control valves, solenoid valves and fail-safe valves is reduced.

(b) Description of the Related Art

Conventional automatic transmissions used in vehicles include a torque converter, a multi-stage gear shift mechanism connected to the torque converter, and a plurality of friction elements actuated by hydraulic pressure for selecting one of the gear stages of the gear shift mechanism, the gear shift mechanism being realized through a planetary gearset. The friction elements are controlled to engaged and disengaged states by a hydraulic control system, which controls pressure generated by an oil pump, to change shift ratios of the planetary gearset.

The friction elements are selectively operated by a plurality of valves, which undergo port conversion to change the flow of hydraulic pressure, and actuators supplying hydraulic pressure to the valves. Further, a manual valve, indexed with a driver-operated shift selector to realize port conversion, is connected to a plurality of lines to supply hydraulic pressure from the oil pump to each valve and actuator.

FIG. 4 shows a hydraulic circuit diagram of a conventional hydraulic control system. The hydraulic control system includes an underdrive clutch UD-C, an overdrive clutch OD-C, a reverse clutch REV-C, a low-reverse brake LR-B, and a second brake 2NB-B. These elements are controlled by hydraulic pressure and perform control to realize four forward speeds and one reverse speed.

Solenoid valves control hydraulic pressure supplied to a plurality of valves, which, in turn, control hydraulic pressure supplied to the friction elements. There are a total of four solenoid valves, one less than the number of friction elements, provided in the hydraulic control system. These include a low-reverse solenoid valve LR-S, a second solenoid valve 2ND-S, an underdrive solenoid valve UD-S and an overdrive solenoid valve OD-S. Valves controlled by the solenoid valves include a low-reverse pressure control valve LR-PCV, a second pressure control valve 2ND-PCV, an underdrive pressure control valve UD-PCV and an overdrive pressure control valve OD-PCV.

Further provided is a switch valve SW-V which reduces line pressure in third and fourth speeds of a drive D range such that stress given to an oil pump OP is reduced and a power transmission efficiency of the automatic transmission is improved. The hydraulic control system also includes a first fail-safe valve FSV-1. The first fail-safe valve FSV-1 prevents the simultaneous operation of the low-reverse brake LR-B and the underdrive clutch UD-C, as well as of the low-reverse brake LR-B, underdrive clutch UD-C and overdrive clutch OD-C. There is also provided a second fail-safe valve FSV-2 which prevents the simultaneous operation of the second brake 2ND-B, underdrive clutch UD-C and overdrive clutch OD-C.

As shown in FIG. 5, the solenoid valves are operated to ON and OFF states in different combinations to realize control into the various speeds and shift modes. That is, as described above, the solenoid valves are operated to ON and OFF states such that the supply of hydraulic pressure to the valves is controlled. This, in turn, controls the supply of hydraulic pressure to specific friction elements to control the same, thereby ultimately controlling the multi-stage gear shift mechanism for control into the different shift speeds and modes.

However, in the conventional hydraulic control system described above, a solenoid valve is provided at each of the friction elements, except for the low-reverse clutch REV-C; a pressure control valve is provided at each of the solenoid valves; and two fail-safe valves are required to prevent the simultaneous operation of the friction elements as described above. This large number of elements complicates the hydraulic control system, and increases overall manufacturing costs and the weight of the hydraulic control system.

SUMMARY OF THE INVENTION

The present invention has been made in an effort to solve the above problems.

It is an object of the present invention to provide a hydraulic control system for a four-speed automatic transmission in which a number of pressure control valves, solenoid valves and fail-safe valves is reduced.

To achieve the above object, the present invention provides a hydraulic control system in which line pressure, drive pressure, reverse pressure and low pressure are selectively supplied from a manual valve to an underdrive clutch, an overdrive clutch, a low-reverse brake, a reverse clutch, and a second brake to realize four forward speeds and a reverse speed. The hydraulic control system includes an underdrive pressure control valve provided between a drive pressure line, connected to the manual valve, and the underdrive clutch, and controlled by a first solenoid valve; an overdrive pressure control valve provided between the drive pressure line and the overdrive clutch, and controlled by a second solenoid valve; a second/low-reverse pressure control valve connected to a line pressure line, connected to the manual valve, and controlled by a third solenoid valve; a solenoid switch valve controlled by low pressure, line pressure or drive pressure supplied respectively from a low pressure line, the line pressure line and the drive pressure line connected to the manual valve, and which supplies hydraulic pressure passed through the second/low-reverse pressure control valve to the low-reverse brake and the second brake; and a fail-safe valve provided between the solenoid switch valve and the second/low-reverse pressure control valve, and is controlled by operational pressure of the underdrive clutch and overdrive clutch, line pressure, and drive or reverse pressure, the fail-safe valve preventing hydraulic pressure supplied from the second/low-reverse pressure control valve from being simultaneously supplied to the second brake and the low reverse brake. The reverse clutch is directly communicated with the manual valve via a reverse pressure line.

According to a feature of the present invention, a valve body of the manual valve includes a first port connected to the line pressure line, a second port connected to the drive pressure line, a third port connected to the low pressure line, a fourth port connected to the reverse pressure line, a fifth port connected to the regulator valve, and exhaust ports; and a valve spool of the manual valve includes first and second lands and an exhaust passage, the first and second lands and the exhaust passage selectively communicating the ports.

According to another feature of the present invention, a valve body of the second/low-reverse pressure control valve includes a first port connected to the line pressure line, a second port connected to the fail-safe valve, a third port connected to a pressure reduction line, a fourth port connected to the third solenoid valve, and exhaust ports; a valve spool of the second/low-reverse pressure control valve includes first, second and third lands for selectively communicating the first and second ports; and an elastic member is interposed between an inside wall of the second/low-reverse pressure control valve and the third land of the valve spool, the elastic member exerting biasing force on the valve spool in a direction toward the third port.

According to yet another feature of the present invention, a valve body of the fail-safe valve includes a first port connected to the second/low-reverse pressure control valve, a second port connected to the solenoid switch valve, a third port connected to the underdrive clutch, a fourth port connected to the overdrive clutch, a fifth port connected to the line pressure line, a sixth port connected to the drive pressure line and the reverse pressure line, and exhaust ports; and a valve spool of the fail-safe valve includes first, second, third, fourth, fifth, sixth and seventh lands.

According to still yet another feature of the present invention, in the case where two of the underdrive clutch UD-C, overdrive clutch OD-C and low reverse brake LR-B are operating, if 0.4 times a line pressure $P_L$ of the remaining element is input, the fail-safe valve FSV operates.

According to still yet another feature of the present invention, the fail-safe valve FSV operates when a sum of an operational pressure $P_{UD}$ of the underdrive clutch UD-C, an operational pressure $P_{OD}$ of the overdrive clutch OD-C, and an operational pressure $P_{2ND}$ of the second brake 2ND-B or an operational pressure $P_{LR}$ of the low-reverse brake LR-B becomes greater than or equal to a predetermined multiple of the line pressure $P_L$.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is a chart illustrating ON and OFF states of solenoid valves for control into various speeds and shift modes according to the preferred embodiment of the present invention;

FIG. 3 is a chart illustrating engaged and disengaged states of friction elements according to various speeds and shift modes according to the preferred embodiment of the present invention;

FIG. 5 is a chart illustrating ON and OFF states of solenoid valves for control into various speeds and shift modes in the conventional hydraulic control system.

DETAILED DESCRIPTION OF THE PREFERRED EMBODIMENTS

Preferred embodiments of the present invention will now be described in detail with reference to the accompanying drawings.

Figure 1:
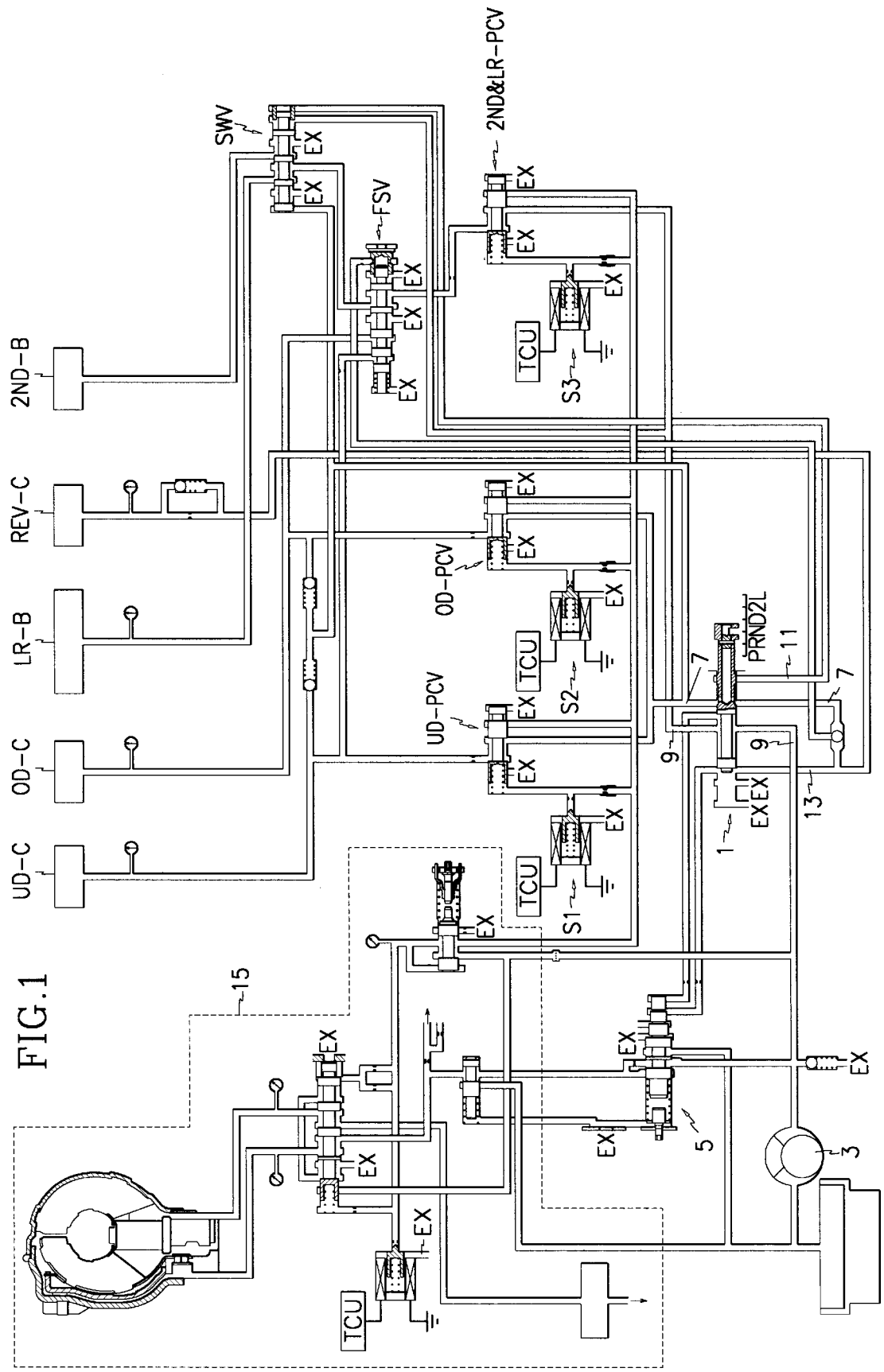
FIG. 1 is a hydraulic circuit diagram of a hydraulic control system according to a preferred embodiment of the present invention.
Figure 4:
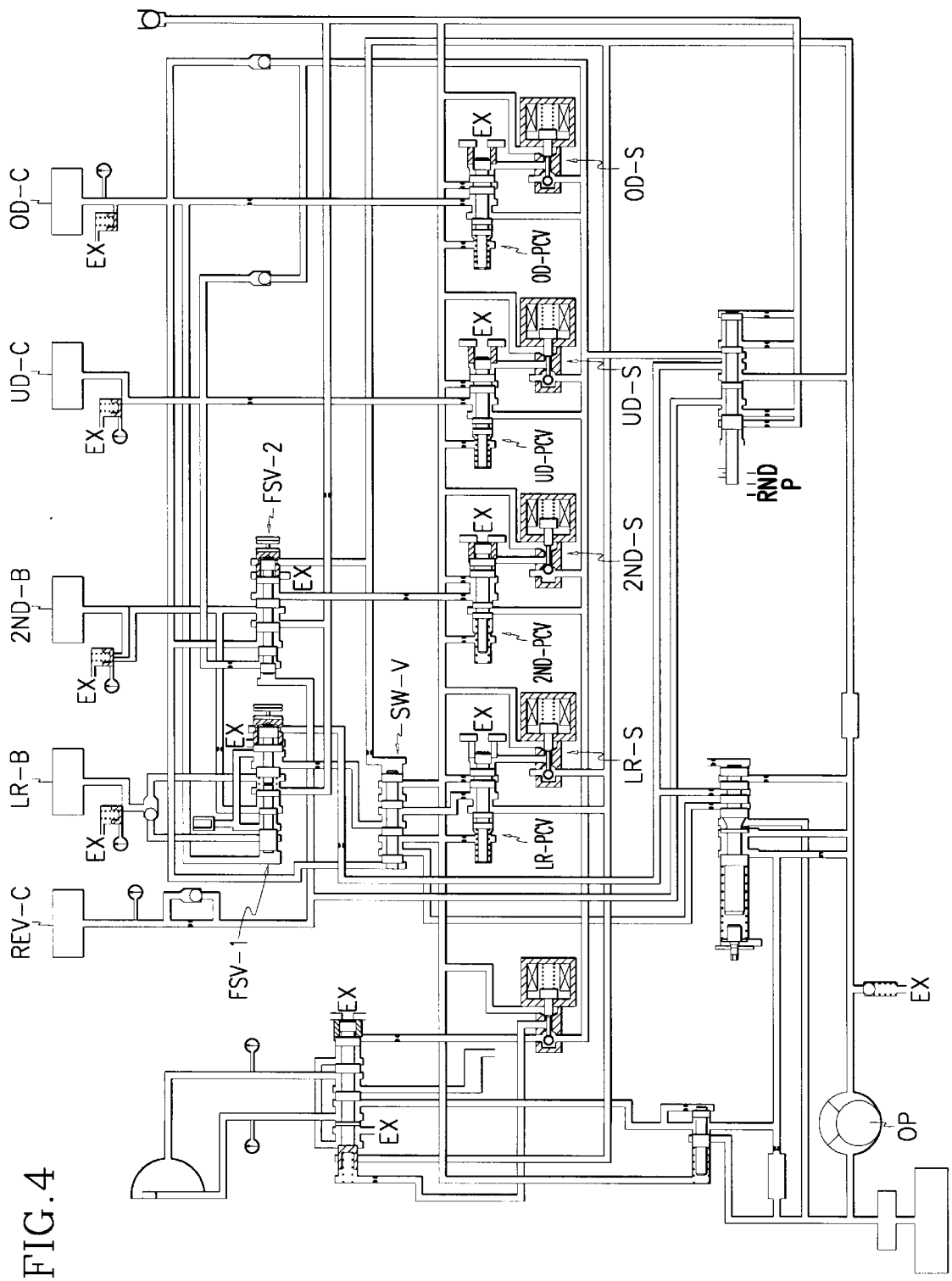
FIG. 4 shows a hydraulic circuit diagram of a conventional hydraulic control system.

FIG. 1 is a hydraulic circuit diagram of a hydraulic control system according to a preferred embodiment of the present invention.

Line pressure, drive pressure, reverse pressure and low pressure are selectively supplied from a manual valve 1 to an underdrive clutch UD-C, an overdrive clutch OD-C, a low-reverse brake LR-B, a reverse clutch REV-C and a second brake 2ND-B to realize four forward speeds and a reverse speed. Also included in the hydraulic control system are an underdrive pressure control valve UD-PCV communicated with the underdrive clutch UD-C, an overdrive pressure control valve OD-PCV communicated with the overdrive clutch OD-C, and a second/low-reverse pressure control valve 2ND/LR-PCV communicated with both the second brake 2ND-B and the low-reverse brake LR-B. The reverse clutch REV-C is communicated directly with the manual valve 1 to receive hydraulic pressure therefrom.

A first solenoid valve S1 is connected to the underdrive pressure control valve UD-PCV to control the same, a second solenoid valve S2 is connected to the overdrive pressure control valve OD-PCV to control the same, and a third solenoid valve S3 is connected to the second/low-reverse pressure control valve 2ND/LR-PCV to control the same. Also provided in the hydraulic control system are a solenoid switch valve SWV and a fail-safe valve FSV, structures and operations of which will be described hereinafter.

The manual valve 1 receives line pressure generated by an oil pump 3 and controlled by a regulator valve 5, and supplies the line pressure to a drive pressure line 7, a line pressure line 9, a low pressure line 11 and a reverse pressure line 13. Formed on a valve body of the manual valve 1 is a first port connected to the line pressure line 9, a second port 17 connected to the drive pressure line 7, a third port 19 connected to the low pressure line 11, a fourth port 21 connected to the reverse pressure line 13, a fifth port 23 connected to the regulator valve 5, and exhaust ports EX.

The manual valve 1 also includes a valve spool 31 having first and second lands 25 and 27 and an exhaust passage 29, the first and second lands 25 and 27 and the exhaust passage 29 selectively communicating the ports 15, 17, 19, 21, 23 and EX. The valve spool 31 of the manual valve 1 is indexed with a driver-manipulated select lever (not shown). That is, the valve spool 31 is moved according to positioning of the select lever to the different shift mode positions of P, R, N, D, 2 and L.

The underdrive pressure control valve UD-PCV is controlled by the first solenoid valve S1 as described above, and acts to supply and exhaust hydraulic pressure between the drive pressure line 7 of the manual valve 1 and the underdrive clutch UD-C. The overdrive pressure control valve OD-PCV is controlled by the second solenoid valve S2 as described above, and acts to supply and exhaust hydraulic pressure between the drive pressure line 7 of the manual valve 1 and the overdrive clutch OD-C.

The second/low-reverse pressure control valve 2ND/LR-PCV is controlled by the third solenoid valve S3 as described above, and acts to supply and exhaust hydraulic pressure between the line pressure line 9 of the manual valve 1 and the fail-safe valve FSV. Formed on a valve body of the second/low-reverse pressure control valve 2ND/LR-PCV are a first port 33 connected to the line pressure line 9, a second port 35 connected to the fail-safe valve FSV, a third port 37 connected to a pressure reduction line 36, a fourth port 39 connected to the third solenoid valve S3, and exhaust ports EX.

The second/low-reverse pressure control valve 2ND/LR-PCV also includes a valve spool 49 having first, second and third lands 43, 45 and 47 for selectively communicating the first and second ports 33 and 35. Also, an elastic member 41 is interposed between an inside wall of the second/low-reverse pressure control valve 2ND/LR-PCV and the third land 47 of the valve spool 49, the elastic member 41 exerting biasing force on the valve spool 49 in the rightward direction (in the drawing). The first land 43 has a smaller surface area on which hydraulic pressure acts than the second and third lands 45 and 47, the second and third lands 45 and 47 having identical surface areas on which hydraulic pressure act.

The solenoid switch valve SWV is controlled by low pressure, line pressure or drive pressure supplied respectively from the low pressure line 11, the line pressure line 9 and the drive pressure line 7 connected to the manual valve 1, and selectively supplies hydraulic pressure passed through the second/low-reverse pressure control valve 2ND/LR-PCV and the fail-safe valve FSV to the low-reverse brake LR-B and the second brake 2ND-B. Formed on a valve body of the solenoid switch valve SWV are a first port 51 connected to the low pressure line 11, a second port 53 connected to the line pressure line 9, a third port 55 connected to the fail-safe valve FSV, a fourth port 57 connected to the second brake 2ND-B, a fifth port 59 connected to the low-reverse brake LR-B, a sixth port 61 connected to the drive pressure line 7, and exhaust ports EX.

Provided in the valve body of the solenoid switch valve SWV is a valve spool 73 having first, second, third, fourth and fifth lands 63, 65, 67, 69 and 71 for selectively communicating the ports 51, 53, 55, 57, 59, 61 and EX. The first land 63 has a smaller surface area on which hydraulic pressure acts than the second, third, fourth and fifth lands 65, 67, 69 and 71, the second, third, fourth and fifth lands 65, 67, 69 and 71 having identical surface areas on which hydraulic pressure acts.

The fail-safe valve FSV is provided between the solenoid switch valve SWV and the second/low-reverse pressure control valve 2ND/LR-PCV, and is controlled by operational pressure of the underdrive clutch UD-C and overdrive clutch OD-C, line pressure, and drive or reverse pressure. The fail-safe valve FSV prevents hydraulic pressure supplied from the second/low-reverse pressure control valve 2ND/LR-PCV from being simultaneously supplied to the second brake 2ND-B and the low reverse brake LR-B. That is, the fail-safe valve FSV prevents the simultaneous operation of the second brake 2ND-B and the low reverse brake LR-B.

Formed on a valve body of the fail-safe valve FSV are a first port 75 connected to the second/low-reverse pressure control valve 2ND/LR-PCV, a second port 77 connected to the solenoid switch valve SWV, a third port 79 connected to the underdrive clutch UD-C, a fourth port 81 connected to the overdrive clutch OV-C, a fifth port connected to the line pressure line 9, a sixth port 85 connected to the drive pressure line 7 and the reverse pressure line 13, and exhaust ports EX. Provided in the valve body is a valve spool 101 having first, second, third, fourth, fifth, sixth and seventh lands 87, 89, 91, 93, 95, 97 and 99. The first land 87 has a smaller surface area on which hydraulic pressure acts than the second, third and fourth lands 89, 91 and 93, which have identical surface areas. Further, the fourth, fifth, sixth and seventh lands 93, 95, 97 and 99 have surface areas that continuously decrease in this order. That is, the fourth land 93 has a surface area larger than the fifth land 95, the fifth land 95 has a larger surface area than the sixth land 97, and the sixth land 97 has a larger surface area than the seventh land 99.

The fail-safe valve FSV operates when a sum of an operational pressure $P_{UD}$ of the underdrive clutch UD-C, an operational pressure $P_{OD}$ of the overdrive clutch OD-C, and an operational pressure $P_{2ND}$ of the second brake 2ND-B or an operational pressure $P_{LR}$ of the low-reverse brake LR-B becomes greater than or equal to a predetermined multiple of line pressure $P_L$. This is expressed in the following equation:

$$P_{UD}+P_{OD}+P_{LR}(\text{or } P_{2ND}) \geq 2.4\ P_L.$$

In the case where two of the underdrive clutch UD-C, overdrive clutch OD-C and low reverse brake LR-B are operating, if 0.4 times the line pressure $P_L$ of the remaining element is input, the fail-safe valve FSV operates.

As stated above, the reverse clutch REV-C is connected directly to the manual valve 1. That is, the reverse clutch REV-C is communicated directly with the manual valve 1 via the reverse pressure line 13. A portion 103 of the hydraulic control system which controls damper clutches is structured and operates identically as in conventional systems, and therefore a detailed description thereof will be omitted. Further, the pressure reduction line 36 connected to the second/low-reverse pressure control valve 2ND/LR-PCV is supplied with pressure of a level lower than line pressure.

In the hydraulic control system for 4-speed automatic transmissions of the present invention structured as in the above, the first, second and third solenoid valves S1, S2 and S3 are duty-controlled to ON and OFF states to realize the different shift modes and speeds as shown in FIG. 2. The underdrive pressure control valve UD-PCV, overdrive pressure control valve OD-PCV, and second/low-reverse pressure control valve 2ND/LR-PCV are controlled by the solenoid valves S1, S2 and S3, respectively. This, together with the direct supply of hydraulic pressure from the manual valve 1, controls the operation of the friction elements UD-C, OD-C, LR-B, REV-C and 2ND-B in different combinations as shown in FIG. 3 to realize shifting into the various speeds and shift modes.

Shifting into the different shift modes and speeds will be described hereinafter.

Shifting from neutral N range to drive D range

The valve spool 73 of the solenoid switch valve SWV is moved to the right (in the drawing) by drive pressure supplied from the drive pressure line 7 connected to the manual valve 1. Next, the first and third solenoid valves S1 and S3 are duty controlled such that the underdrive clutch UD-C and the low-reverse brake LR-B are operated. The third solenoid valve S3 is then duty controlled such that the hydraulic control system enters a clip mode, and if a throttle opening is increased, the low-reverse brake LR-B is disengaged, thereby realizing shifting into a first speed of the drive D range.

Shifting from first speed to second speed

In a state where the underdrive clutch UD-C is operating, the third solenoid valve S3 is duty controlled to operate the second brake 2ND-B such that shifting into a second speed of the drive D range results.

Shifting from second to third speed or from third to second speed

In a state where the underdrive clutch UD-C is operating, the second and third solenoid valves S2 and S3 are duty controlled to operate or disengage the overdrive clutch OD-C and disengage or operate the second brake 2ND-B, thereby realizing shifting either into the third speed from the second speed or into the second speed from the third speed.

Shifting from third to fourth speed or from fourth to third speed

In a state where the overdrive clutch OD-C is operating, the first and third solenoid valves S1 and S3 are duty controlled to operate or disengage the second brake 2ND-B and disengage or operate the underdrive clutch UD-C, thereby realizing shifting either into the fourth speed form the third speed or into the third speed from the fourth speed.

Shifting from neutral N range to reverse R range

The valve spool 73 of the solenoid switch valve SWV is moved to the left (in the drawing) by reverse pressure supplied from the reverse pressure line 13 connected to the manual valve 1. Next, the third solenoid valve S3 is duty controlled such that the low-reverse brake LR-B is operated, after which the reverse clutch REV-C id directly operated by the reverse pressure supplied to the reverse pressure line 13. This results in shifting into the reverse R range from the neutral N range.

Shifting from drive D range to low L range

In a state where the underdrive clutch UD-C is operating, the valve spool 73 of the solenoid switch valve SWV is moved to the left (in the drawing) by low pressure supplied to the low pressure line 11 connected to the manual valve 1. Next, the third solenoid valve S3 is duty controlled such that the low-reverse brake LR-B is operated by the line pressure, thereby realizing shifting into the low L range from the drive D range.

If all of the first, second and third solenoid valves S1, S2 and S3 malfunction, drive pressure supplied from the manual valve 1 passes through the underdrive clutch UD-C and the overdrive clutch OD-C to operate the underdrive clutch UD-C and the overdrive clutch OD-C, thereby holding the third speed of the drive D range. Since the level of line pressure is lower than a sum of the operational pressures of the underdrive clutch UD-C and the overdrive clutch OD-C, the fail-safe valve FSV prevents the hydraulic pressure supplied from the second/low-reverse pressure control valve 2ND/low-reverse PCV from being supplied to the second brake 2ND-B and the low-reverse brake LR-B.

In the hydraulic control system of the present invention described above, one of each of the pressure control valves, solenoid valves and fail-safe valves is omitted from the system compared to the conventional hydraulic control system. Accordingly, the overall weight of the hydraulic control system is reduced, and the system is made less complicated and costly.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system for 4-speed automatic transmissions in which line pressure, drive pressure, reverse pressure and low pressure are selectively supplied from a manual valve to an underdrive clutch, an overdrive clutch, a low-reverse brake, a reverse clutch, and a second brake to realize four forward speeds and a reverse speed, the hydraulic control system comprising:

an underdrive pressure control valve provided between a drive pressure line, connected to the manual valve, and the underdrive clutch, and controlled by a first solenoid valve;

an overdrive pressure control valve provided between the drive pressure line and the overdrive clutch, and controlled by a second solenoid valve;

a second/low-reverse pressure control valve connected to a line pressure line, connected to the manual valve, and controlled by a third solenoid valve;

a solenoid switch valve controlled by low pressure, line pressure or drive pressure supplied respectively from a low pressure line, the line pressure line and the drive pressure line connected to the manual valve, and which supplies hydraulic pressure passed through the second/low-reverse pressure control valve to the low-reverse brake and the second brake; and a fail-safe valve provided between the solenoid switch valve and the second/low-reverse pressure control valve, and is controlled by operational pressure of the underdrive clutch and overdrive clutch, line pressure, and drive or reverse pressure, the fail-safe valve preventing hydraulic pressure supplied from the second/low-reverse pressure control valve from being simultaneously supplied to the second brake and the low reverse brake, wherein the reverse clutch is directly communicated with the manual valve via a reverse pressure line.

2. The hydraulic control system of claim 1 wherein a valve body of the manual valve includes a first port connected to the line pressure line, a second port connected to the drive pressure line, a third port connected to the low pressure line, a fourth port connected to the reverse pressure line, a fifth port connected to the regulator valve, and exhaust ports; and a valve spool of the manual valve includes first and second lands and an exhaust passage, the first and second lands and the exhaust passage selectively communicating the ports.

3. The hydraulic control system of claim 1 wherein a valve body of the second/low-reverse pressure control valve includes a first port connected to the line pressure line, a second port connected to the fail-safe valve, a third port connected to a pressure reduction line, a fourth port connected to the third solenoid valve, and exhaust ports; a valve spool of the second/low-reverse pressure control valve includes first, second and third lands for selectively communicating the first and second ports; and an elastic member is interposed between an inside wall of the second/low-reverse pressure control valve and the third land of the valve spool, the elastic member exerting biasing force on the valve spool in a direction toward the third port.

4. The hydraulic control system of claim 1 wherein a valve body of the fail-safe valve includes a first port connected to the second/low-reverse pressure control valve, a second port connected to the solenoid switch valve, a third port connected to the underdrive clutch, a fourth port connected to the overdrive clutch, a fifth port connected to the line pressure line, a sixth port connected to the drive pressure line and the reverse pressure line, and exhaust ports; and a valve spool of the fail-safe valve includes first, second, third, fourth, fifth, sixth and seventh lands.

5. A hydraulic control system for 4-speed automatic transmissions in which line pressure, drive pressure, reverse pressure and low pressure are selectively supplied from a manual valve to an underdrive clutch, an overdrive clutch, a low-reverse brake, a reverse clutch, and a second brake to realize four forward speeds and a reverse speed, the hydraulic control system comprising:

an underdrive pressure control valve provided between a drive pressure line, connected to the manual valve, and the underdrive clutch, and controlled by a first solenoid valve;

an overdrive pressure control valve provided between the drive pressure line and the overdrive clutch, and controlled by a second solenoid valve;

a second/low-reverse pressure control valve connected to a line pressure line, connected to the manual valve, and controlled by a third solenoid valve;

a solenoid switch valve controlled by low pressure, line pressure or drive pressure supplied respectively from a low pressure line, the line pressure line and the drive pressure line connected to the manual valve, and which supplies hydraulic pressure passed through the second/low-reverse pressure control valve to the low-reverse brake and the second brake; and a fail-safe valve provided between the solenoid switch valve and the second/low-reverse pressure control valve, and is controlled by operational pressure of the underdrive clutch and overdrive clutch, line pressure, and drive or reverse pressure, the fail-safe valve preventing hydraulic pressure supplied from the second/low-reverse pressure control valve from being simultaneously supplied to the second brake and the low reverse brake, wherein the reverse clutch is directly communicated with the manual valve via a reverse pressure line, and wherein in the case where two of the underdrive clutch UD-C, overdrive clutch OD-C and low reverse brake LR-B are operating, if 0.4 times a line pressure $P_L$ of the remaining element is input, the fail-safe valve FSV operates.

6. The hydraulic control system of claim 5 wherein the fail-safe valve FSV operates when a sum of an operational pressure $P_{UD}$ of the underdrive clutch UD-C, an operational pressure $P_{OD}$ of the overdrive clutch OD-C, and an operational pressure $P_{2ND}$ of the second brake 2ND-B or an operational pressure $P_{LR}$ of the low-reverse brake LR-B becomes greater than or equal to a predetermined multiple of the line pressure $P_L$.

* * * * *